United States Patent
Leon

(10) Patent No.: US 6,680,923 B1
(45) Date of Patent: Jan. 20, 2004

(54) COMMUNICATION SYSTEM AND METHOD

(75) Inventor: Robert Leon, Miami, FL (US)

(73) Assignee: Calypso Wireless, Inc., Miami, FL (US)

( * ) Notice: Subject to any disclaimer, the term of this patent is extended or adjusted under 35 U.S.C. 154(b) by 0 days.

(21) Appl. No.: 09/577,812

(22) Filed: May 23, 2000

(51) Int. Cl.[7] .............................................. H04L 12/64
(52) U.S. Cl. ....................................... 370/328; 370/352
(58) Field of Search ................................ 370/328, 329, 370/330, 338, 345, 349, 352, 353, 354, 355, 356, 343, 395.2, 395.3, 395.52

(56) References Cited

U.S. PATENT DOCUMENTS

| | | | |
|---|---|---|---|
| 5,910,946 A | * | 6/1999 | Csapo ......................... 370/328 |
| 6,023,241 A | | 2/2000 | Clapper |
| 6,028,764 A | | 2/2000 | Richardson et al. |
| 6,040,784 A | | 3/2000 | Miller |
| 6,047,047 A | | 4/2000 | Aldridge et al. |
| 6,049,291 A | | 4/2000 | Kikinis |
| 6,052,812 A | | 4/2000 | Chen et al. |
| 6,272,348 B1 | * | 8/2001 | Saario et al. ............ 455/452.1 |
| 6,549,543 B1 | * | 4/2003 | Shin ........................... 370/474 |
| 6,570,871 B1 | * | 5/2003 | Schneider ................... 370/356 |
| 6,601,040 B1 | * | 7/2003 | Kolls ........................... 705/14 |
| 6,608,832 B2 | * | 8/2003 | Forslow ...................... 370/353 |

* cited by examiner

Primary Examiner—Kwang Bin Yao
(74) Attorney, Agent, or Firm—Malloy & Malloy, P.A.

(57) ABSTRACT

A system and method for establishing communication with any one of a variety of different wireless communication devices including through the provision of a short range transceiver assembly so as to provide data communication from a sender to the wireless communication device either over the Internet, utilizing an Internet access facility, such as a computer, or alternatively using an over-the-air network, compatible with the communication device. The wireless communication device is structured to operate on either of at least two independent frequencies for communication with the computer or with the over-the-air network, dependent on predetermined parameters including the acceptance of a unique identifier or code and/or the positioning of the wireless communication device, within a predetermined vicinity range relative to the computer. An auto switching capability establishes data communication with the computer or with the over-the-air network, dependent on whether the identification and vicinity parameters have been met.

30 Claims, 2 Drawing Sheets

COMMUNICATION SYSTEM AND METHOD

BACKGROUND OF THE INVENTION

1. Field of the Invention

This invention is directed to a system and method of establishing wireless communication either over the Internet, through an Internet access facility, such as a computer, or alternatively by a compatible over-the-air network, dependent on whether the wireless communication device and the Internet access facility are relatively located inside or outside a pre-established vicinity range. The system includes auto-switching capabilities for determining the route of communication with the wireless communication device dependent, at least in part, on predetermined parameters, which may include the pre-established vicinity range and recognition of a unique identifier associated with at least the wireless communication device.

2. Description of the Related Art

At the present time, it is well recognized that the wireless communication industry is enjoying a period of dramatic growth. Although the number of subscribers is still relatively low, as compared to the maximum capacity available, carriers are offering networks with excellent coverage, lower prices and an increasing variety of additional options. As such, there is a recognized limit to the traditional wireless communications capabilities. As such, even with the recent advancements in wireless communication technology there exists even more opportunity to provide subscribers with vastly improved wireless communication standards.

Additionally, it is recognized that with the increasing popularity of local or global computerized networks, individuals are relying more and more heavily on alternate means of communication and information gathering. Still, however, each of these communications mediums despite there usefulness, are maintained generally independent from one another, requiring a user to utilize the specified technological medium applicable. Moreover, as the technologies are maintained generally independent from one another, they do not take full advantage of integration possibilities available due to advances in technology. For example, one increasingly popular medium for wireless communication relates to the use of "Bluetooth" technology. Such technology allows short range, wireless communication between devices, thereby providing more versatility and eliminating many cabling limitations/requirements that may limit expansion. Still, however, despite the advantageous nature of such wireless communications protocols, the use of such technology is currently limited to traditional communicative links, replacing a more traditional connectivity solution. As such, the art has failed to truly explore the cross-over potentials available through the expansion of such technology.

Accordingly there is a substantial need in the art for a system and method which enables the integration or cross-over of various generally related technologies so as to substantially increase the versatility and productivity of the communications services offered. Specifically, as will be described within the context of the present invention and has yet been un-addressed in the art, such improved technology could include a hybrid communication system which will operate using standard flex paging protocol in combination with Bluetooth or similar technology for short range messaging. Such an improved hybrid communication system should have the ability to automatically switch to messaging communication with the wireless communication device using, for example, an Internet access facility, such as a personal computer (PC), when two transceivers incorporating the Bluetooth or equivalent technology are within the pre-established vicinity range. Alternatively, such an improved system as provided by the present invention could automatically switch to over-the-air network messaging with the wireless communication device, when outside the pre-established vicinity range, representing substantial savings for both the carriers and the users. In particular, carriers could save money by freeing up limited band width and thereby have the capacity to subscribe more users, while not having to upgrade current infrastructure hardware. Users on the other hand could save money because they would have the ability to send and receive large messages and e-mail wirelessly, when within the aforementioned pre-established vicinity range, at a cost no more than the cost of their current network connection, plus current one-way messaging service.

SUMMARY OF THE INVENTION

This invention is directed to a system and method of hybrid communication which provides data communication including, but not limited to, voice, video and/or alphanumeric messaging, either over the computerized network, such as the Internet, using an appropriate access facility, such as a personal computer, or alternatively by means of an over-the-air network such as, but not limited to, a cellular/paging network satellite communication and other applicable types of communication networks. The wireless communication device, as set forth above, may include a pager, cellular telephone, personal digital assistant (PDA) or other applicable wireless communication devices structured and designed to perform data communication.

The system and method of the present invention incorporates a transceiver assembly operative on a recognized-spread spectrum standard capable of short range communication such as "Bluetooth technology". As is recognized in the communication field, Bluetooth technology incorporates 2.4 GHz wireless data solution utilizing spread spectrum techniques as set forth in detail above. However, as utilized hereinafter the term "transceiver assembly" refers to any type of short range technology operable in the fashion of "Bluetooth technology" but not limited thereto.

More specifically, the hybrid communication system and method of the present invention comprises the utilization of one or more wireless communication devices, of the type set forth above, each having a transceiver connected thereto and operable on a short range radio frequency (RF), wherein each of the plurality of wireless communication devices include a unique identifier or code capable of being recognized by another compatible transceiver, which also defines a part of the aforementioned transceiver assembly. More specifically, a first transceiver designed to function in accordance with Bluetooth or equivalent technology, is connected to an Internet access facility such as, but not limited to, a computer facility or PC. A second transceiver is connected to the wireless communication device. Obviously, the system and method of the present invention contemplates the provision of a plurality of network access facilities or computers and a plurality of wireless communication devices, wherein, for purposes of clarity, each of the aforementioned plurality of computers may be connected to a first transceiver and each of the aforementioned plurality of wireless communication devices may be connected with a second transceiver. The unique identifiers associated with each of the plurality of wireless communication devices are unique onto themselves and serve as an identifying code to any one of the appropriately programmed or configured first transceivers associated with different ones of the plurality of computers. Recognition and the establishment of messaging communication may be dependent, at least in part, on at least one predetermined parameter. One such predetermined parameter may be a vicinity range, wherein the first and second transceivers, in order to recognize one another must be within a pre-established vicinity. Currently such a pre-established vicinity range may be generally about 100 meters. However, it is emphasized that the vicinity range is not limited to 100 meters and can vary greatly based at least in part on technological advancements and the specific applications of the present invention. Another possible predetermined parameter may be the unique identifier itself, wherein communication between any one of the plurality of network access facilities or computers must identify and accept the unique identifier or code of the wireless communication device as well as be within the predetermined vicinity range. As set forth above, the vicinity range may be pre-established and determined based on current technological standards and may vary greatly.

The communication system and method of the present invention also incorporates auto-switching capabilities, wherein data communication is automatically established with the access facility when at least one, or both of the aforementioned predetermined parameters (vicinity range and identification) have been established and wherein a first transceiver associated with the Internet access facility and the second transceiver associated with the wireless communication device are configured to recognize and accept one another to establish such communication. Alternatively, the auto-switching capabilities of the present invention establishes data communication by means of a compatible over-the-air network, such as an appropriate paging/cellular network, satellite communication, etc. when either or both of the predetermined parameters between a given access facility and a corresponding wireless communication device are not met. More particularly and also by way of example only, the wireless communication device, when in the acceptable vicinity range of a computer, wherein both incorporate a first and second transceiver as set forth above, can perform data communication over the network, such as the Internet, by means of the computer or other access facility. However, when the wireless communication device is disposed beyond the established vicinity range, the auto-switching capabilities will automatically provide for data communication with the wireless communication device by means of the over-the-air network, as set forth above. The wireless communication device associated with the system and method of the present invention is therefore capable of being operative over at least two distinct frequency ranges, dependent on data communication being established with the computer or Internet access facility or a paging/cellular infrastructure, which may define a compatible over-the-air network.

Other features of the system and method of the present invention comprise the transceiver assembly, whether incorporating Bluetooth technology or its equivalent, including a scanning capability wherein scanning for recognition, preferably of the unique identifier associated with each of the transceivers is conducted and when the aforementioned predetermined parameters, including for example an acceptable vicinity range of 100 meters or other pre-established distance, is met, mutual recognition of the first and second transceivers is accomplished. Such scanning may therefore be referred to as a "find-me-follow-me" procedure which may occur on a substantially continuous basis.

In addition to the above, the communication system and method of the present invention also may include configuration capabilities. This allows messages which would be normally communicated by means of the over-the-air network to be "stored" until communication with a particular one of the plurality of wireless communication devices is established with an appropriate computer incorporating the transceiver assembly technology of the type set forth above. Then, communication is established between the computer and the particular wireless communication device to which the messages were originally sent. Alternatively, the configuration capabilities may allow the selective configuring of the system, such that any stored messages would be transmitted only during a pre-selected time window. Such configuring of course may assume a variety of other data regulating configurations.

One advantage of the hybrid communication system and method of the present invention which may serve as an incentive is the concept of "revenue sharing". More specifically, the system provides the capability of the owner of a computer to decide which wireless communication devices may have access to the network, utilizing his or her computer, assuming that both the computer and any one of the plurality of wireless communication devices are associated with the same piconet of the Bluetooth or equivalent transceiver assembly technology. The system may include security software allowing only wireless devices with "permission" to be able to access the computer's network. As the incentive to open access to others, including strangers, revenue sharing would involve the service provider system giving credit, in the form of money or other incentives, to the owner of the computer which allows access to "stranger" wireless communication devices.

These and other features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
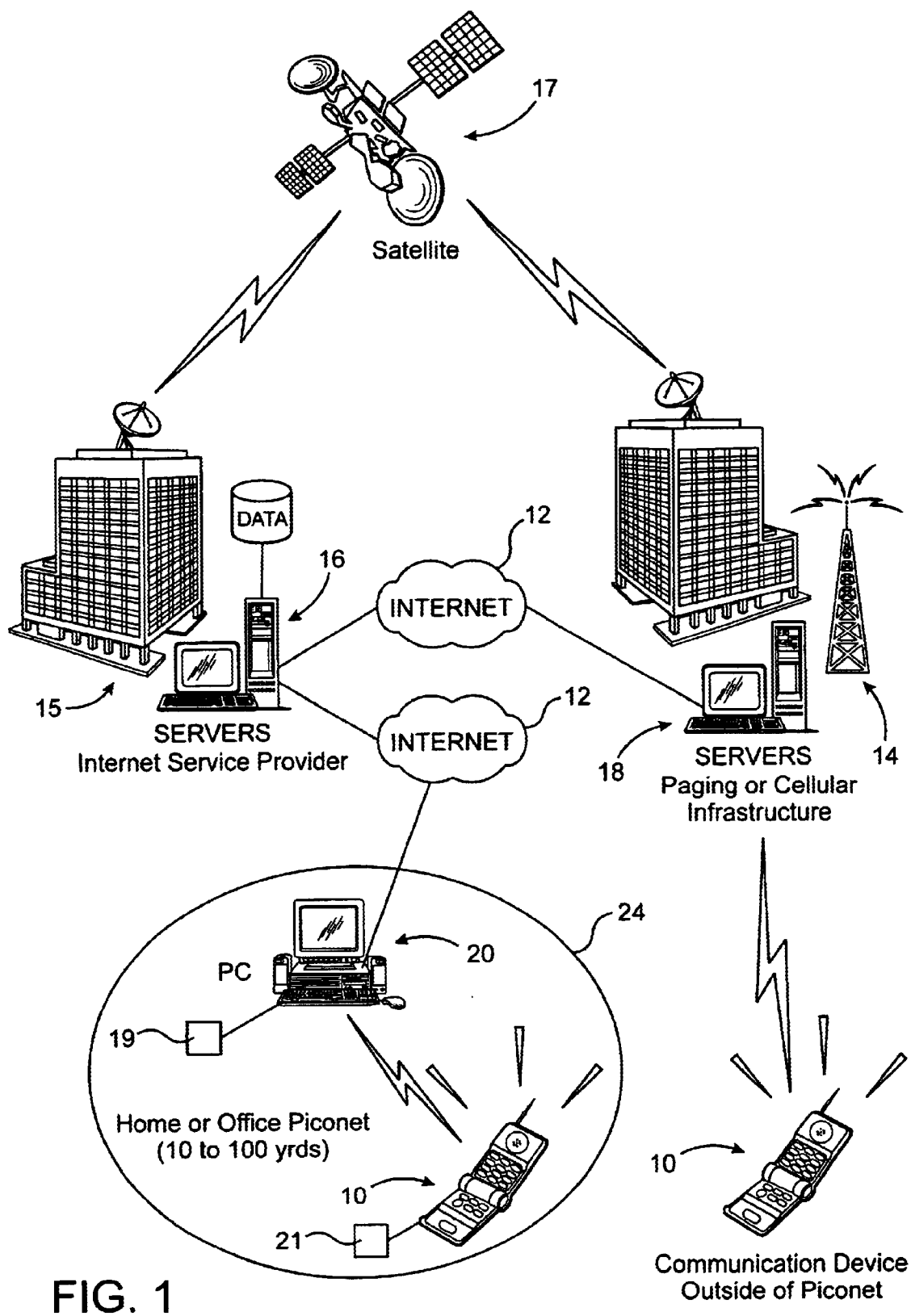
FIG. 1 is a schematic representation of the hybrid communication system and method of the present invention.

The present invention relates to a system and method of hybrid communication wherein communication is established with any one of a plurality of wireless communication devices, generally indicated as 10 in FIG. 1. Such wireless communication devices may of course include a pager assembly, cellular telephone, PDA, etc. More importantly, messaging communication can be established with any of the plurality of wireless communication devices 10 either by means of a global or local computerized network, such as for example, the Internet 12 through an Internet service provider 15 including one or more servers 16, or alternatively by a compatible over-the-air network, generally indicated as 14, also including appropriate servers 18. The over-the-air network can be defined by any compatible paging and/or cellular infrastructure, satellite communication 17 or other appropriate communication facilities, dependent on the type of wireless communication device 10 being utilized and a variety of other related factors.

In one preferred embodiment of the present invention, a transceiver assembly is utilized to provide possible short range wireless communication. By way of example, this transceiver assembly may be in the form of or incorporate Bluetooth technology. Specifically, Bluetooth technology is a used for short range communication between various devices and is the official name of a specification that has become one of the fastest growing technology standards in recent times. Simply put, Bluetooth is a specification for a global wireless technology standard that allows devices to communicate with each other using a secure radio frequency. As such, the use of a Bluetooth transceiver enables at least short range communication without the burden of cables, but at a high rate of data transmission, without line-of-site requirements, typically necessary for infrared technology. In such an embodiment, the transceiver assembly may include at least one small, low power radio transceiver mounted on a chip that communicates with other Bluetooth-enabled device. Because it operates on radio frequency (RF) Bluetooth eliminates the need for cables and can connect on a one-to-one or on a one-to-many basis. In addition, at least the illustrated Bluetooth transceiver has the enhanced versatility of supporting voice and video data as well as other data communications, thereby allowing it to be extended into hands-free voice communications. In an embodiment wherein the Bluetooth technology is integrated, it may use a 2.4 GHz range, spread spectrum standard radio band, which is un-licensed and available almost worldwide. In addition, the transceiver assembly is preferably capable of transmitting through solid, non-metal objects, enjoying an operative range of generally from 10 cm to 10 m, which is typically extended to a vicinity range of about 100 meters, by increasing the transmitting power, and is omni directional, supporting both isochronous and asynchronous services.

Also in the illustrated embodiment incorporating the Bluetooth technology, such a transceiver assembly enables a connection and communication wirelessly via short-range, ad hoc networks and can normally support up to eight peripheral devices in a "piconet", which may be defined as two or more Bluetooth or equivalent technology units sharing a common channel. Furthermore, the transceiver assembly may be structured to provide synchronous voice channels which allows the assembly to reserve bandwidth for carrying digital voice data. As such, the system can support three or more simultaneous, full duplex voice conversations within a given piconet.

Also in this embodiment wherein a Bluetooth or similar transceiver is utilized, authentication and encryption is preferably provided in its baseband protocol. For example, the authentication may rely on a challenge/response protocol utilizing a unique identifier (password, PIN, etc.). Two devices communicating with one another within the appropriate or pre-established vicinity range must contain or have recognition of the same unique identifier. This protocol allows each device to authenticate the other, automatically. After the devices are authenticated it is possible to encrypt transmission for added security.

Additionally, it is noted that the Bluetooth and equivalent transceiver assembly technology integrated into the present invention may be designed to carry voice, data and video information at approximately, but not limited to, 760 Kbps. While this speed of data transmission is not favorably compared to present day wire speed, it is equal to or substantially better than the speed achieved by current digital subscriber lines (DSL)or cable modem services. At this speed, the transceiver assembly can handle video or full stereo sound, and can supply high resolution images at a somewhat lower frame rate while simultaneously carrying voice and data streams.

Of course, despite the preceding, it is emphasized that the system and method of the present invention utilizes the term "transceiver assembly", which in the context of the present invention, is meant to include the aforementioned Bluetooth technology or any other transceiver technology utilizing an applicable frequency and/or short range communication standard which may or may not have all of the functional characteristics of Bluetooth. As such, the system and method of communication of the present invention is not meant to be limited to Bluetooth technology, and the subsequent specific description utilization and explanation of certain characteristics previously recited as being characteristic of a Bluetooth transceiver are not intended to be limited to such technology.

Accordingly, the transceiver assembly of the present invention comprises at least one transceiver 19, preferably in the form of a transceiver chip operative on radio frequencies (RF), wherein such a first transceiver 19 is connected to one or a plurality of network access assemblies, such as a PC or like computer facility generally indicated as 20. The transceiver assembly of the system and method of the present invention also includes at least a second transceiver 21 also in the form of a radio chip connected to or incorporated within each of the plurality of wireless communication devices 10. Each of the wireless communication devices 10 may also include a unique identifier or "code" to facilitate recognition between the first and second transceiver chips 19 and 21. As explained in greater detail hereinafter, the unique identifier may define one of a plurality of predetermined parameters, more specifically referred to as an identification parameter, utilized to establish messaging communication with appropriate ones of a plurality of wireless communication devices 10. When recognized each of the wireless communication devices 10 becomes part of a piconet, generally indicated as 24, which may exist in a home, office, or any other area incorporating one or more Internet access facilities or computers 20. The piconet 24 may be defined by the operative features of the aforementioned transceiver assembly. At least one other predetermined parameter which way be established, based at least in part on the short range frequency standard on which the transceiver assembly operates, is a pre-established vicinity range. More specifically, the pre-established vicinity range may be currently defined as about 100 meters. However, it is emphasized that the actual vicinity range incorporated in the present invention may vary greatly and is not limited to the indicated 100 meters. The pre-established vicinity range therefore allows data communication, over the computerized network, such as the Internet 12, with the wireless communication device 10, by means of the computer 20, provided that the first transceiver 19 associated with the computer 20 and the second transceiver 21 associated with the wireless communication device 10, are compatible or configured to recognize one another. In order to accomplish this identification parameter, the maximum distance between the wireless communication device 10 and the computer 20 must be within the pre-established vicinity range, which of course may vary, as described above.

Each of the plurality of wireless communication devices are multi-line, to the extent that they are capable of operating on at least two, but possibly more, distinct frequencies. Accordingly, once the communication device 10 wanders outside of the pre-established vicinity range of the piconet 24 an auto-switching capability associated with the system and method of the present invention preferably, but not necessarily, automatically establishes communication between the wireless communication device 10 and the over-the-air network 14. As set forth above, the over-the-air network may be defined by appropriate cellular/pager infrastructure, including server 18 or other communication networks such as, but not limited to, satellite communication 17 and others.

The communication system and method of the present invention also incorporates scanner capabilities, which is more specifically incorporated within the aforementioned transceiver assembly. Operative features of the scanner capabilities of the present invention provide for preferably continuous scanning, wherein the first and second transceivers 19 and 21 are continuously searching to establish messaging communication between compatibly configured computers 20 and wireless communication devices 10. The scanning capabilities are completed when, for example, one of the plurality of wireless communication devices 10 wanders within the pre-established vicinity range of the piconet 24 and includes a unique identifier or code which is recognizable by the first transceiver 19 associated with the computer 20. Upon recognition and when all the pre-determined parameters have been met, messaging communication between the computer 20 and the one or more wireless communication devices 10 is established. The communication system and method of the present invention also includes selective configuration capabilities which allows a user to configure his account to regulate data transmission to a particular wireless communication device. Such selective configuration can be accomplished via a particular communication device 10 or alternatively through the website of the Internet service provider 15 and/or the individual servers 16, at least when an Internet type computerized network is utilized.

Figure 2:
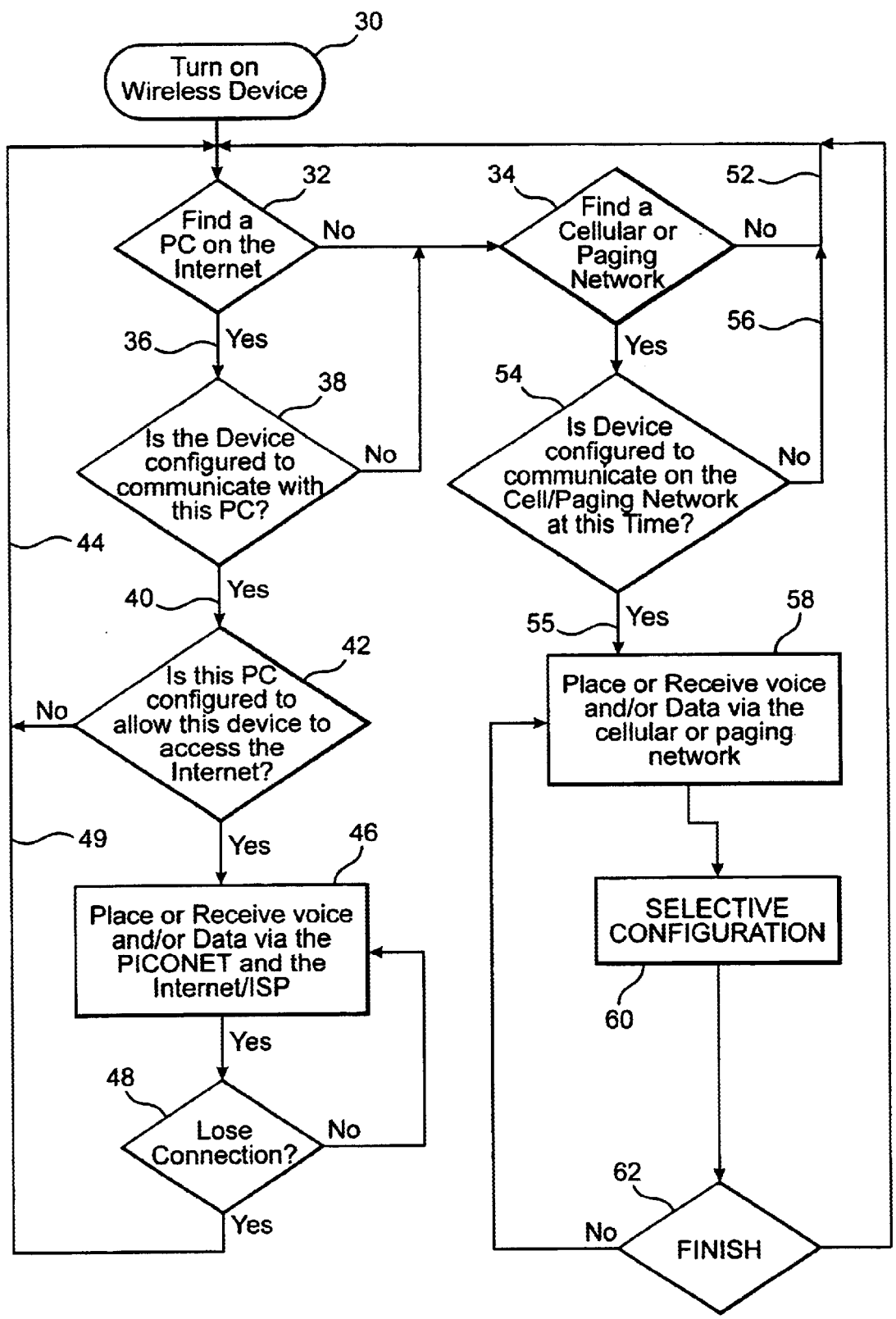
FIG. 2 is a schematic representation in flow chart form of certain operative steps which are representative of and at least partially define the system and method of the present invention.

Turning to FIG. 2, and by way of example only, a method of operation and utilization of the communication system of the present invention is illustrated. More specifically, in operation anyone of the plurality of wireless communication devices 10 is activated as at 30 and, through operation of the continuous scanning capabilities, as set forth above, a first and second transceiver 19 and 21, associated with the transceiver assembly of the present invention, provide for a "find-me-follow-me" procedure in an attempt to recognize one another and establish messaging communication, as at 32. If the aforementioned pre-determine parameters of identification and vicinity range are not met the auto-switching capabilities of the present invention are automatically operative to find an appropriate, compatible over-the-air network such, as a cellular/paging, satellite or other appropriate network, as at 34. However, assuming that the wireless communication device 10 locates an Internet access facility or computer as at 36, it is next determined, through operative features of the transceiver assembly and combined features of the scanning assembly, whether the computer 20 is configured to recognize and communicate with the wireless communication device 10, as indicated as 38. The configuring of both the computer 20 and the wireless communication device 10 is accomplished by the appropriate programming of the first and second transceivers 19 and 21 defining the aforementioned transceiver assembly. Next, assuming compatible configuration between the computer 20 and the wireless communication device 10 as indicated at 40, it is determined whether the computer 20 is configured to allow the particular wireless communication device 10 to access the Internet 12 as at 42. If the computer 20 is not so configured, then the scan capability is operative to continue searching for a computer which is compatible to the extent of allowing data communication to be established with the particular wireless communication device. However, if no computer can be located, the auto-switching capability is again operative to transfer data communication to an appropriate or compatible over-the-air network 14, as at 44. However, if computer 20 is configured to access the computerized network 12, data communication is thereby established as at 46, wherein voice, video, alphanumeric or other data may be sent or received by virtue of the piconet 24, over the computerized network 12, utilizing the network service provider 15. If the connection is lost as at 48, the auto-switching capability returns to the scanning capabilities as at 49, 44 to continuously search for a compatible Internet access facility or computer 20 or alternatively switches to communication with an over-the-air network, as at 34.

Alternatively, and as explained above, if a predetermined parameter of establishing data communication within the piconet 24, between computer 20 and the wireless communication device 10, is not established, such as by the wireless communication 10 being located outside the pre-established vicinity range, a search is made for a compatible over-the-air network 14, such as, but not limited to a cellular, or paging network infrastructure and/or server 18 or other appropriate over-the-air network, such as satellite communication. If one is not found, as at 52, the auto-switching capabilities, as well as the continuous scanning facility, are re-activated, as at 32 and the procedure begins again. Alternatively, assuming that the wireless communication devices are properly configured to establish communication by means of the over-the-air network 14, the decision as at 54 is made whether current data communication may be established. If not, as at 56, the auto-switching and scanning capabilities of the system are re-activated as set forth above. Assuming that current communication is allowed as at 55 data communication may be conducted, as at 58.

The system and method of the present invention may further comprise selective configuration capabilities, as generally set forth above and as indicated as 60 in FIG. 2. This means that the receipt of data by means of the over-the-air network 14 or the computerized network 12, through the computer 20 may be pre-configured by the user. More specifically, the user may configure a particular account so as to regulate data communication with the particular wireless communication device 10, in terms of how and when such data may be received on either the computer 20 or the over-the-air network 14. By way of example only, the user 10 may selectively configure the account, utilizing either a particular wireless communication device 10 or alternatively the website of the Internet service provider 15, to establish communication, utilizing the transceiver assembly to only accomplish compatible recognition between specific computers 20 and certain wireless communication devices 10. Alternatively, the user can control or regulate what type of data and/or at what time certain communications can be sent by the over-the-air network 14 or over the Internet 12.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A hybrid communication system for wireless data communication said system comprising:
   a) a wireless communication device including a unique identifier and capable of conducting data communication through an over-the-air network,
   b) a computer configured for computerized network access,
   c) a transceiver assembly operative on a short range communication standard and structured to interconnect said wireless communication device with a computer facility to establish data communication therewith,
   d) said transceiver assembly including a first transceiver connected to said computer and at least a second transceiver connected to said wireless communication device and an auto-switching capability responsive to pre-determined parameters,
   e) said auto-switching capability being determinative of data communication with said wireless communication device either over the computerized network through said computer facility or by the over-the-air network dependent on the establishment of said redetermined parameters, and
   f) at least one of said predetermined parameters comprising a pre-established vicinity range.

2. A system as recited in claim 1 wherein said transceiver assembly is operative on a short range frequency.

3. A system as recited in claim 1 wherein said auto-switching capability establishes data communication with said wireless communication device outside said pre-established vicinity range.

4. A system as recited in claim 3 wherein said transceiver assembly automatically establishes communicative recognition between said computer and said wireless communication device within said pre-established vicinity range.

5. A system as recited in claim 4 wherein said predetermined parameters further comprise recognition compliance of said wireless communication device based at least partially on said unique identifier.

6. A hybrid communication system for data communication, said system comprising:
   a) a plurality of wireless communication devices each including a unique identifier and capable of establishing messaging communication by an over-the-air network,
   b) a plurality of Internet access facilities each capable of recognizing different ones of said wireless communication devices by means of said unique identifiers,
   c) a transceiver assembly comprising a plurality of first transceivers each connected to a different one of said Internet access devices and a plurality of second transceivers each connected to a different one of said plurality of wireless communication devices,
   d) said transceiver assembly including an auto-switching switching capability responsive to said predetermined parameters,
   e) said predetermine parameters comprising acceptance of said unique identifiers and a pre-established vicinity range existing between any one of said wireless communication devices and any one of said plurality of Internet access devices, and
   f) said transceiver assembly and said auto-switching capability determinative of data communication with said wireless communication device, either by said over-the-air network or by Internet access, dependent on the establishment of said predetermined parameters.

7. A system as recited in claim 6 wherein said transceiver assembly includes a scanner capability.

8. A system as recited in claim 7 wherein said scanner capability is structured to provide continuous searching by at least one of said first plurality of transceivers or said second plurality of transceivers for the other and establish communication there between, when a corresponding one of said plurality of wireless communication devices is within said pre-established vicinity range of said plurality of Internet access facilities.

9. A system as recited as recited in claim 7 further comprising a configuration facility selectively operative to regulate transmission of data to any one of said plurality of wireless communication devices by means of said over-the-air network.

10. A system as recited in claim 9 wherein said over-the-air network is responsive to selectively store all data intended for transmission to any one of said plurality of wireless communication devices and/or transmit data thereto within a selectable time window.

11. A method of hybrid communication utilizing a multi-frequency wireless communication device and an Internet access facility, said method comprising:
    a) establishing communication between the Internet access facility and the wireless communication device when both are located within a pre-establish vicinity range,
    b) communicating data to the wireless communication device over he Internet through the Internet access facility,
    c) alternaltively establishing data communication with the wireless communication device by a compatible over-the-air network when the Internet access facility and the wireless communication device are disposed outside of the pre-established vicinity range, and
    d) automatically switching messaging communication with said wireless communication device between the Internet and the over-the-air network dependent at least on said wireless communication device being inside or outside said pre-established vicinity range relative to the Internet access facility.

12. A method as recited in claim 11 comprising establishing at least two-way messaging with the wireless communication device over the Internet through the Internet access facility.

13. A method as recited in claim 12 comprising establishing at least one-way messaging with said wireless communication device by the over-the-air network.

14. A method as recited in claim 11 comprising conducting a scan by at least one of the wireless communication device or Internet access facility for the other to establish communication therebetween when both are within the pre-established vicinity range.

15. A method as recited in claim 11 comprising configuring either the wireless communication device or the Internet access facility to selectively regulate time and/or content of messaging data to the wireless communication device.

16. A hybrid communication system for wireless data communication said system comprising:
    a) a wireless communication device including a unique identifier and capable of conducting data communication through an over-the-air network, b) a computer configured for computerized network access, c) a transceiver assembly operative on a short range communication standard and structured to interconnect said wireless communication device and a computer facility to establish data communication therewith, d) said transceiver assembly including a first transceiver connected to said computer and at least a second transceiver connected to said wireless communication device and an auto-switching capability responsive to pre-determined parameters, e) said auto-switching capability being determinative of data communication with said wireless communication device either over the computerized network through said computer facility or by the over-the-air network dependent on the establishment of said predetermined parameters, f) at least one of said predetermined parameters comprising a pre-established vicinity range, and g) said wireless communication device comprising a pager assembly including multi-line communication capabilities operable on at least two independent frequency ranges.

17. A system as recited in claim 16 wherein said first and second transceivers are operative to at least establish data communication between said computer facility and said pager assembly within said pre-established vicinity range.

18. A system as recited in claim 17, wherein said pager assembly is operative to establish data communication by said over-the-air network outside of said pre-established vicinity range.

19. A system as recited in claim 18 wherein said auto-switching capability is responsive to said pre-established vicinity range to automatically establish at least two way messaging between said pager assembly and said computer facility when said pager assembly is within pre-established said vicinity range.

20. A system as recited in claim 18 wherein said auto-switching capability is responsive to said pre-established vicinity range to automatically establish at least one-way messaging with said over-the-air network when said pager assembly is outside said vicinity range.

21. A system as recited in claim 20 wherein said auto-switching switching capability is responsive to said pre-established vicinity range to automatically establish at least two-way messaging between said pager assembly and said computer when said pager assembly is within said vicinity range.

22. A system as recited in claim 21, wherein said auto switching capability is structured to automatically switch said pager assembly from data communication through said over-the-air network, when said pager assembly is outside said vicinity range to data communication with said computer facility, when said pager assembly is within said vicinity range.

23. A system as recited in claim 22 wherein said pager assembly comprises an alphanumeric pager.

24. A hybrid communication system for wireless data communication said system comprising:

a) a wireless communication device including a unique identifier and capable of conducting data communication through an over-the-air network, b) a computer configured for computerized network access, c) a transceiver assembly operative on a short range communication standard and structured to interconnect said wireless communication device a computer facility to establish data communication therewith, d) said transceiver assembly including a first transceiver connected to said computer and at least a second transceiver connected to said wireless communication device and an auto-switching capability responsive to pre-determined parameters, e) said auto-switching capability being determinative of data communication with said wireless communication device either over the computerized network through said computer facility or by the over-the-air network dependent on the establishment of said predetermined parameters, f) at least one of said predetermined parameters comprising a pre-established vicinity range, and g) said transceiver assembly including a scanning capability, said scanning capability structured to provide continuous searching by at least one of said first or second transceivers for the other of said transceivers and establish communication there between when said wireless communication device is within said pre-established vicinity range.

25. A system as recited in claim 24 wherein said pre-established vicinity range defines at least one of said pre-determined parameters.

26. A system as recited in claim 25 wherein said pre-established vicinity range comprises at least 100 meters.

27. A hybrid communication system for wireless data communication said system comprising:

a) a wireless communication device including a unique identifier and capable of conducting data communication through an over-the-air network, b) a computer configured for computerized network access, c) a transceiver assembly operative on a short range communication standard structured to interconnect said wireless communication device a computer facility to establish data communication therewith, d) said transceiver assembly including a first transceiver connected to said computer and at least a second transceiver connected to said wireless communication device and an auto-switching capability responsive to pre-determined parameters, e) said auto-switching capability being determinative of data communication with said wireless communication device either over the computerized network through said computer facility or by the over-the-air network dependent on the establishment of said predetermined parameters, f) at least one of said predetermined parameters comprising a preestablished vicinity range, and g) said transceiver assembly including selective configuration capability responsive to said first and second transceivers being located within said pre-established vicinity range; said system structured to instruct said over the air network to regulate transmission of data to said wireless communication device.

28. A system as recited in claim 27 wherein said over-the-air network is responsive to selective storage of all data to said wireless communication device and/or transmit data to said wireless communication device within a selectable time window.

29. A system as recited in claim 28 wherein modification of said selective configuration capability is performed through said wireless communication device.

30. A system as recited in claim 29 wherein modification of said selective configuration capability is performed through said computer.

* * * * *